United States Patent [19]
Murata et al.

[11] Patent Number: 4,518,249
[45] Date of Patent: May 21, 1985

[54] SLIT ILLUMINATION SYSTEM FOR COPYING MACHINE AND THE LIKE

[75] Inventors: Tomoji Murata, Toyokawa; Masamichi Hayashi, Aichi; Yasuo Goto; Seiichi Sakurai, both of Toyokawa, all of Japan

[73] Assignee: Minolta Camera Kabushiki Kaisha, Osaka, Japan

[21] Appl. No.: 552,243

[22] Filed: Nov. 16, 1983

[30] Foreign Application Priority Data

Nov. 30, 1982 [JP] Japan ............................... 57-210368

[51] Int. Cl.³ ............................................ G03B 27/54
[52] U.S. Cl. ......................................... 355/67; 355/8; 355/51; 362/346
[58] Field of Search ................... 355/8, 11, 51, 67, 57; 362/297, 301, 303, 346, 349

[56] References Cited

U.S. PATENT DOCUMENTS

| 3,947,115 | 3/1976 | Hamaguchi | 355/8 |
| 3,982,116 | 9/1976 | Sakuma | 355/67 X |
| 4,225,923 | 9/1980 | Bloemendaal et al. | 362/346 X |
| 4,239,383 | 12/1980 | Peterson | 355/67 |
| 4,295,186 | 10/1981 | Sugiura | 355/67 X |

Primary Examiner—Richard A. Wintercorn
Attorney, Agent, or Firm—Wenderoth, Lind & Ponack

[57] ABSTRACT

The present invention concerns with a slit illumination system for use in a copying machine or the like, which includes a light source, a first and second elliptical mirrors, a third plane mirror, and a supplemental mirror positioned behind the light source and between the first and second mirrors. The supplemental mirror directs the light which does not contribute to the illumination by the first and second mirror to the original through a light path extending directly to the original and/or a light path extending to the original through the third mirror.

19 Claims, 3 Drawing Figures

SLIT ILLUMINATION SYSTEM FOR COPYING MACHINE AND THE LIKE

FIELD OF THE INVENTION

The present invention relates to a slit illumination system for copying machines and the like, and more particularly to improvements in a reflecting mirror for directing light from a light source to an original.

BACKGROUND OF THE INVENTION

Copying machines of certain type and original document reading devices are adapted to illuminate an original in the form of a slit and transmit an image of the original to a photosensitive member. With such devices, the original may be moved relative to the illumination system which is at rest, or a portion of the illumination system, as well as of the image transmitting means, may be moved under a stationary transparent glass plate having the original placed thereon. In either case, illumination systems of the construction shown in FIG. 1 are most widely used.

With reference to FIG. 1, an original 10 is placed on a transparent glass plate 11, and a mirror 13 for transmitting an image of the original 10 is disposed immediately below the portion 12 of the original 10 to be illuminated. The image of the original is directed from the illuminated portion 12 to an unillustrated photosensitive member through the mirror 13, etc. A light source 1 and elliptical mirrors 2, 3 are provided on one side of the optical path OP, and a plane mirror 4 is disposed on the other side.

The first elliptical mirror 2 is shaped along part of a first ellipse E1. The first ellipse E1 has a major axis MA1 extending through the light source 1 and the illuminated portion 12 and has its first focus $F_{11}$ positioned at the center of the light source 1 and its second focus $F_{12}$ within the transparent glass plate 11.

The second elliptical mirror 3 is shaped along part of a second ellipse E2. The first focus $F_{21}$ of the second ellipse E2 coincides with the first focus $F_{11}$ of the first ellipse E1, while the major axis MA2 thereof through the first focus $F_{21}$ and its second focus $F_{22}$ extends toward the plane mirror 4. The second ellipse E2 is so positioned that the image of the second focus $F_{22}$ formed by the plane mirror 4 will coincide with the second focus $F_{12}$ of the first ellipse E1 which is positioned within the glass plate 11. The image of the second ellipse E2 formed by the plane mirror 4 is illustrated as an ellipse E2'.

With the above arrangement, the bundle of rays emitted from the light source 1 and reflected from the first elliptical mirror 2 passes through a light path, which is shown by leftwardly upward hatching, on the left side of the optical path OP for the image of the original and is directed directly toward the illuminated portion 12. On the other hand, the bundle of rays emitted from the light source 1 and reflected from the second elliptical mirror 3 crosses the optical path OP for the image of the original and is then reflected again from the plane mirror 4 and directed to the illuminated portion 12 through a light path which is shown by rightwardly upward hatching on the right side of the optical path OP. In this way, the original 10 is illuminated from opposite sides of the optical path OP for the original image in order to prevent the shadows of edges of the original from appearing as black lines in the resulting copy. The ellipses E1 and E2 are further so arranged that the bundles of rays will be incident on the illuminated portion at a smaller angle to thereby achieve an improved illumination efficiency. For example, if the second elliptical mirror 3 is formed along the first ellipse E1, the bundle of rays reflected therefrom will be incident on the illuminated portion at a larger angle to lower the illumination efficiency, in other words, the ratio of the amount of light actually reaching the photosensitive member as the original image to the amount of light illuminating the original.

It is now assumed that at the center of the light source 1, i.e., at the first foci $F_{11}$, $F_{12}$ of the ellipses E1, E2, angles $\alpha$, $\beta$ are subtended by the first elliptical mirror 2 and the second elliptical mirror 3, respectively. The light emitted from the center of the light source then reaches the mirrors 2, 3 within these angular ranges $\alpha$, $\beta$, respectively. According to the definition of the ellipse, the light is reflected toward the individual second foci. However, the portions of the two elliptical mirrors 2, 3 behind the light source 1 which subtend angles $\gamma$, $\delta$ at the center of the light source do not actually contribute to the illumination of the original because the light within these ranges of angles $\gamma$, $\delta$ are reflected from the mirrors and returned to the light source 1, where the light is diffused, absorbed and refracted by the tubular surface, filament, etc. of the light source 1.

In the case of such a system designed by the present inventor wherein $\alpha = 125°$ and $\beta = 139°$, the angles $\gamma$, $\delta$ were as large as 36° and 61°, respectively. In this case, the apparent angle of reflection ($\alpha = \beta$) is 264°, whereas the effective angle of reflection ($\alpha = \beta - \gamma - \delta$) is as small as 167°. Thus the illumination system is very low in illumination efficiency.

OBJECTS AND BRIEF SUMMARY OF THE INVENTION

The main object of the present invention is to provide a slit illumination system free of the foregoing drawback and useful for a copying machine or the like.

Another object of the invention is to provide a slit illumination system for use in copying machines or the like which has an improved illumination efficiency to give a larger amount of light actually contributing to illumination than conventional systems when the same light source is used and to assure savings in the power supply to the light source when illuminating originals with the same brightness as conventional devices.

These and other objects of the invention can be achieved by a slit illumination system used in a copying machine or the like and including a light source, a first elliptical mirror directing the light from the light source to an original and positioned between the light source and an optical path for an image corresponding to the original and a second elliptical mirror positioned on one side of the optical path and directing the light from the light source to the original through a third mirror positioned on the other side of the optical path, said system comprising a supplemental mirror positioned behind the light source and between the first and second mirrors for illuminating the original through the light path extending directly to the original and/or the light path extending to the original through the third mirror.

BRIEF DESCRIPTION OF THE DRAWINGS

In the following description, like parts are designated by like reference numbers throughout the several drawings.

DETAILED DESCRIPTION OF THE INVENTION

Figure 1:
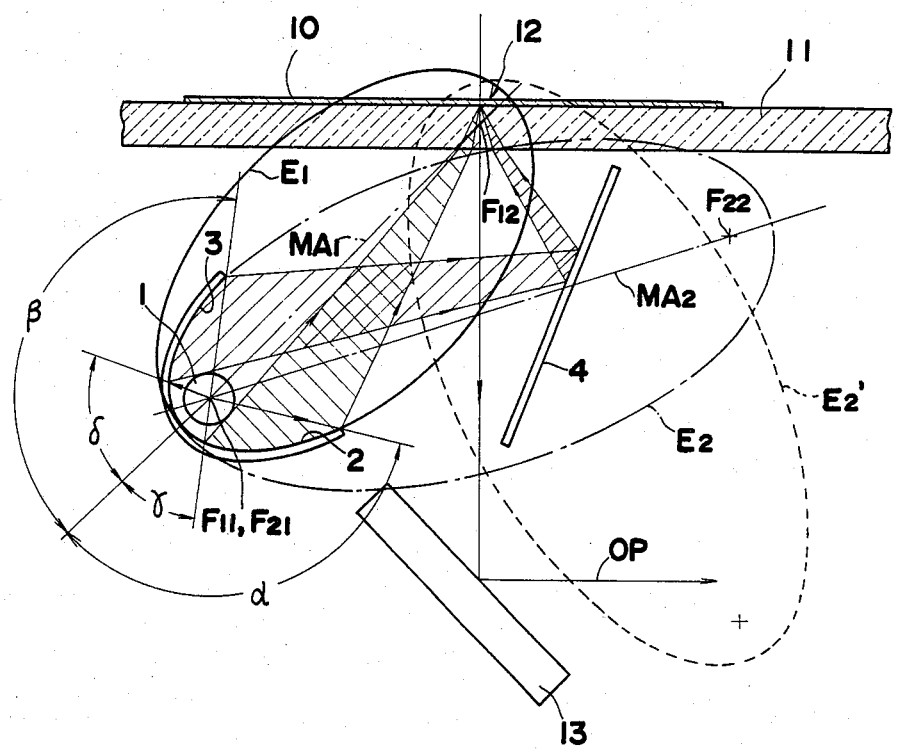
FIG. 1 is a diagram in section showing a typical example of conventional slit illumination system.
Figure 2:
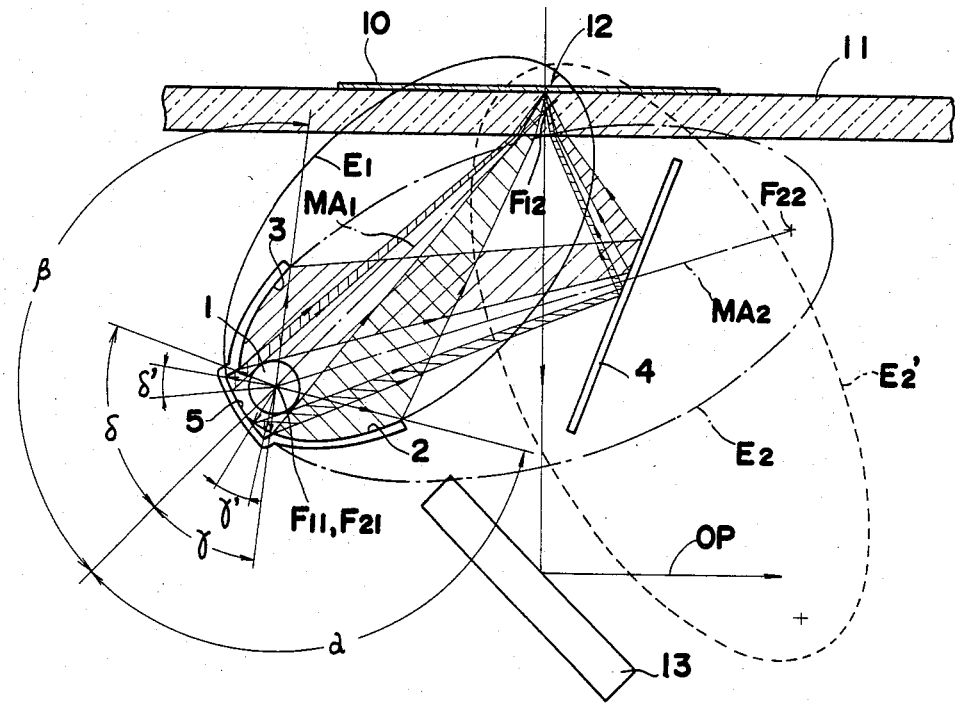
FIG. 2 is a diagram in section showing an embodiment of slit illumination system of the invention.

FIG. 2 shows a first embodiment of the invention, which, like the system of FIG. 1, is so designed that light converges on one point 12 where an original 10 is to be illuminated.

The system of FIG. 2 closely resembles the system of FIG. 1 with the exception of a component disposed behind the light source. In FIG. 1, the first elliptical mirror 2 and the second elliptical mirror 3 are joined together in the rear of the light source, whereas FIG. 2 shows a supplemental elliptical mirror 5 subtending an angle $\gamma+\delta$. The mirror 5 includes one portion subtending the angle : and formed along the second ellipse E2 like the second elliptical mirror 3, and the other portion subtending the angle $\delta$ and formed along the first ellipse E1 like the first elliptical mirror 2.

When the supplemental elliptical mirror 5 is thus formed, the portion thereof along the second ellipse E2 and within the angle $\gamma$ is positioned outward from the corresponding portion of FIG. 1. Consequently the reflected light within the range of angle $\gamma'$ passes through a light path shown by horizontal hatching in FIG. 2 and is directed to the illuminated portion 12 through the plane mirror 4.

The other portion of the mirror 5 within the angle $\delta$ and along the first ellipse E1 is similarly positioned outward from the corresponding portion of FIG. 1, with the result that the reflected light within the range of angle $\delta'$ passes through a light path shown by vertical hatching in FIG. 2 and is directed to the illuminated portion 12.

When the embodiment of FIG. 2 was designed based on the design data shown with reference to FIG. 1, the angle $\gamma'$ was 19°, and the angle $\delta$ was 17°. Of the angle at the center of the light source 1 covered by the mirrors 2 and 3 of FIG. 1, the angle through which the reflected light can be effectively directed to the original was 167° $(=\alpha+\beta-\gamma-\delta)$, whereas the corresponding angle of the embodiment of FIG. 2 was 36° $(=\gamma'+\delta')$ larger. The ratio between these angles is 1.22 $(=(167°+36°)/167°)$, thus indicating an increase of as great as 22%. According to experiments, the ratio of actual amount of illuminating light shows an increase of about 20 to 30%.

Although the supplemental elliptical mirror 5 is provided behind the light source in corresponding relation to both the first and second elliptical mirrors 2 and 3 in the embodiment of FIG. 2, a supplemental elliptical mirror portion may be formed only beside one of the mirrors 2 and 3.

Figure 3:
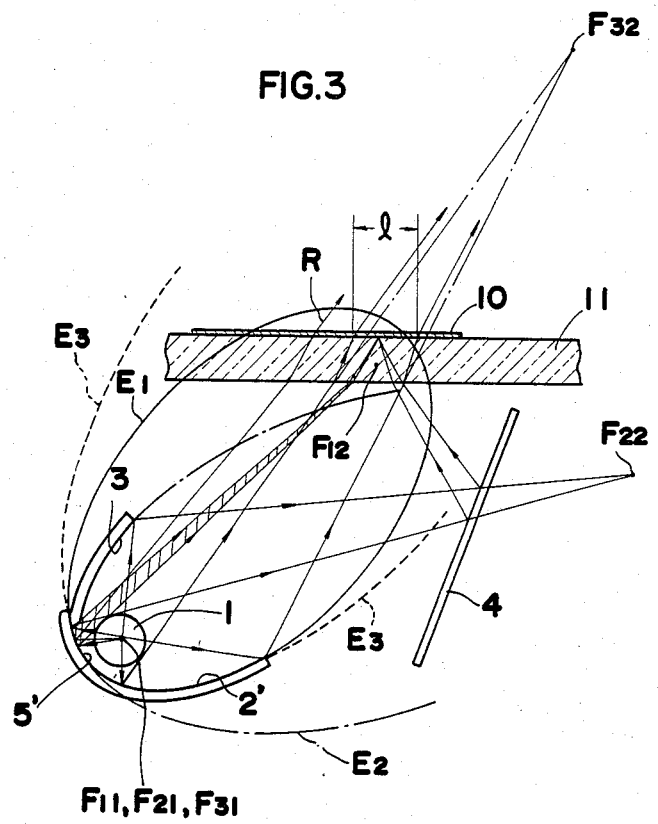
FIG. 3 is a diagram in section showing another embodiment of slit illumination system of the invention.

FIG. 3 shows an embodiment in which a supplemental elliptical mirror portion is provided behind the light source at the side of the second elliptical mirror 3 only. Further with this embodiment, the reflected light from a first elliptical mirror 2′ is adapted to illuminate the original over a width. For this purpose, the first elliptical mirror 2′ is formed along a third ellipse E3 having a first focus $F_{31}$ at the center of the light source and a second focus $F_{32}$ above the transparent glass plate 11.

The light reflected from the first elliptical mirror 2′ illuminates an area of width l corresponding to the width of slit.

As is the case with FIG. 2, the second elliptical mirror 3 is formed along the second ellipse E2, and the light reflected therefrom converges on the illuminated portion through the plane mirror 4.

With the illumination system of such construction, the supplemental elliptical mirror portion to be disposed at the side of the second elliptical mirror 3 and behind the light source 1 can not be formed along the third ellipse E3 unlike the embodiment of FIG. 2, because if the supplemental mirror portion is so formed, the light reflected therefrom will be deflected from the illuminated portion of width : as indicated at R in FIG. 3.

In this case, therefore, a supplemental elliptical mirror 5′ is formed along the ellipse E1 having the first focus $F_{11}$ at the center of the light source 1 and the second focus $F_{12}$ within the transparent glass plate 11. When the supplemental mirror 5′ is thus formed, the light reflected therefrom is directed to the illuminated portion of the original 10 as indicated by vertical hatching in FIG. 3 to achieve an improved illumination efficiency.

As a modification of the embodiment of FIG. 3, the original may be illuminated with light over the width : by the second elliptical mirror or by both the first and second elliptical mirrors.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A slit illumination system for use in a copying machine or the like comprising; a light source, first elliptical mirror directing the light from the light source to an original and positioned on one side of an optical path for an image corresponding to the original and between the light source and the optical path, a second elliptical mirror positioned on the same side of the optical path as the first mirror and farther than the first mirror with respect to the optical path and directing the light from the light source to the original through a third mirror positioned on the other side of the optical path, and a supplemental mirror positioned behind the light source and between the first and second mirrors for illuminating the original through a light path extending directly to the original and/or a light path extending to the original through the third mirror.

2. A slit illumination system as claimed in claim 1, wherein the first mirror is shaped along a part of a first ellipse (E1) which has a first focus (F11) positioned at the center of the light source and a second focus (F12) positioned within a transparent glass plate having the original placed thereon and at a portion illuminated by the second mirror, and the supplemental mirror has at least a portion so formed to shape along a part of the first ellipse (E1).

3. A slit illumination system as claimed in claim 2, wherein said portion of the supplemental mirror is provided behind the light source at the side of the second mirror.

4. A slit illumination system as claimed in claim 1, wherein the second mirror is shaped along a part of a second ellipse (E2) which has a first focus (F21) positioned at the center of the light source and a second focus (F22) positioned behind the third mirror and located symmetrically with respect to the third mirror to a point which is positioned within a transparent glass plate having the original placed thereon and at a portion illuminated by the first mirror, and the supplemental mirror has at least a portion so formed to shape along a part of the second ellipse (E2).

5. A slit illumination system as claimed in claim 4, wherein said portion of the supplemental mirror is provided behind the light source at the side of the first mirror.

6. A slit illumination system as claimed in claim 1, wherein the first mirror is shaped along a part of a first ellipse (E1) which has a first focus (F11) positioned at the center of the light source and a second focus (F12) positioned within a transparent glass plate having the original placed thereon and at a portion illuminated by the second mirror, and the supplemental mirror has at least a portion so formed to shape along a part of an ellipse which has a first focus positioned at the center of the light source and a second focus positioned behind the third mirror and located symmetrically with respect to the third mirror to a point which is positioned within a transparent glass plate having the original placed thereon and at the illuminated portion.

7. A slit illumination system as claimed in claim 6, wherein said portion of the supplemental mirror is provided behind the light source at the side of the first mirror.

8. A slit illumination system as claimed in claim 1, wherein the second mirror is shaped along a part of a second ellipse (E2) which has a first focus (F21) positioned at the center of the light source and a second focus (F22) positioned behind the third mirror and located symmetrically with respect to the third mirror to a point which is positioned within a transparent glass plate having the original placed thereon and at a portion illuminated by the first mirror, and the supplemental mirror has at least a portion so formed to shape along a part of the first ellipse (E1) which has a first focus (F11) positioned at the center of the light source and a second focus (F12) positioned within a transparent glass plate having the original placed thereon and at the illuminated portion.

9. A slit illumination system as claimed in claim 8, wherein said portion of the supplemental mirror is provided behind the light source at the side of the second mirror.

10. A slit illumination system as claimed in claim 1, wherein the first mirror is shaped along a part of a first ellipse (E1) which has a first focus (F11) positioned at the center of the light source and a second focus (F12) positioned within a transparent glass having the original placed thereon, the second mirror is shaped along part of a second ellipse (E2) which has a first focus (F21) positioned at the center of the light source and coinciding to the first focus (F11) for the first mirror and a second focus (F22) positioned behind the third mirror and located symmetrically with respect to the third mirror to the second focus (F12) for the first mirror, and the supplemental mirror has a portion so formed to shape along a part of the first ellipse (E1) and/or the second ellipse (E2).

11. A slit illumination system as claimed in claim 10, wherein said portion of the supplemental mirror, which is shaped along a part of the first ellipse (E1), is provided behind the light source and at the side of the second mirror, and said portion of the supplemental mirror, which is shaped along a part of the second ellipse (E2), is provided behind the light source and at the side of the first mirror.

12. A slit illumination system as claimed in claim 1, wherein the first mirror is shaped along a part of an ellipse which has a first focus positioned at the center of the light source and a second focus positioned above a transparent glass plate having the original placed thereon and the supplemental mirror has at least a portion so formed to shape along a part of an ellipse (E1) which has a first focus (F11) positioned at the center of the light source and a second focus (F12) positioned within the transparent glass plate and at a portion illuminated by the first and second mirrors for illuminating the original through the light path extending directly to the original.

13. A slit illumination system as claimed in claim 12, wherein said portion of the supplemental mirror is provided behind the light source at the side of the second mirror.

14. A slit illumination system as claimed in claim 1, wherein the first mirror is shaped along a part of an ellipse which has a first focus positioned at the center of the light source and a second focus positioned above a transparent glass plate having the original placed thereon, and the supplemental mirror has at least a portion so formed to shape along a part of an ellipse (E2) which has a first focus (F21) positioned at the center of the light source and a second focus (F22) positioned behind the third mirror and located symmetrically with respect to the third mirror to a point which is positioned within the transparent glass plate and at a portion illuminated by the first and second mirrors for illuminating the original through the light path extending to the original through the third mirror.

15. A slit illumination system as claimed in claim 14, wherein said portion of the supplemental mirror is provided behind the light source at the side of the first mirror.

16. A slit illumination system as claimed in claim 1, wherein the second mirror is shaped along a part of an ellipse which has a first focus positioned at the center of the light source and a second focus positioned behind the third mirror and located symmetrically with respect to the third mirror to a point which is positioned above a transparent glass plate have the original placed thereon, and the supplemental mirror has at least a portion so formed to shape along a part of an ellipse (E1) which has a first focus (F11) positioned at the center of the light source and a second focus (F12) positioned within the transparent glass plate and at a portion illuminated by the first and second mirrors for illuminating the original through the light path extending directly to the original.

17. A slit illumination system as claimed in claim 16, wherein said portion of the supplemental mirror is provided behind the light source at the side of the second mirror.

18. A slit illumination system as claimed in claim 1, wherein the second mirror is shaped along a part of an ellipse which has a first focus positioned at the center of the light source and a second focus positioned behind the third mirror and located symmetrically with respect to the third mirror to a point which is positioned above a transparent glass plate having the original placed thereon, and the supplemental mirror has at least a portion so formed to shape along a part of an ellipse (E2) which has a first focus (F21) positioned at the center of the light source and a second focus (F22) positioned behind the third mirror and located symmetrically with respect to the third mirror to a point which is positioned within the transparent glass plate and at the portion illuminated by the first and second mirrors for illuminating the original through the light path extending to the original through the third mirror.

19. A slit illumination system as claimed in claim 18, wherein said portion of the supplemental mirror is provided behind the light source at the side of the first mirror.

* * * * *